United States Patent [19]

Drummond

[11] 4,045,195

[45] Aug. 30, 1977

[54] METHOD OF PREPARING GLASS STRAND AND NOVEL GLASS STRAND PACKAGES

[75] Inventor: Warren W. Drummond, Allison Park, Pa.

[73] Assignee: PPG Industries, Inc., Pittsburgh, Pa.

[21] Appl. No.: 637,344

[22] Filed: Dec. 3, 1975

[51] Int. Cl.[2] .......... C03B 37/02

[52] U.S. Cl. .......... 65/2; 57/34 B; 57/157 F; 65/11 W; 242/18 G; 242/157 R

[58] Field of Search .......... 65/11 W, 2, 5, 16; 242/18 G, 157 R; 28/21, 72 SP; 57/140 G, 157 F, 34 B

[56] References Cited

U.S. PATENT DOCUMENTS

| | | | |
|---|---|---|---|
| 2,690,628 | 10/1954 | Courtney et al. | 65/11 W X |
| 2,880,457 | 4/1959 | Schuller | 65/11 W X |
| 3,306,721 | 2/1967 | Rollins et al. | 65/11 W |
| 3,773,483 | 11/1973 | Schmidt | 65/5 X |

*Primary Examiner*—Robert L. Lindsay, Jr.
*Attorney, Agent, or Firm*—Alan T. McDonald; John E. Curley

[57] ABSTRACT

A method of winding glass is provided in which strands of fiber glass prior to collection on a high speed winder are subjected to a high turbulent fluid passed tangential to the strand in a chamber. The strand prior to treatment with the turbulent fluid is tension reduced. The strand treated in this manner has a false twist imparted thereto as well as a curvilinear wave form. The strand is wound after it leaves the turbulent zone and exhibits a mini-traverse in winding in addition to the normal traverse of strand which occurs as the strand traverses the length of the winder by reciprocation of the winder and/or the zone of turbulence.

12 Claims, 6 Drawing Figures

FIG. 1
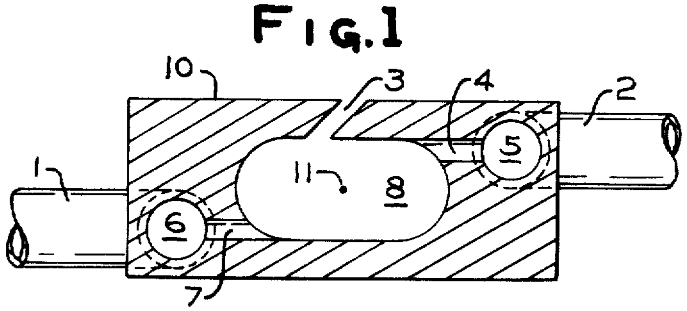
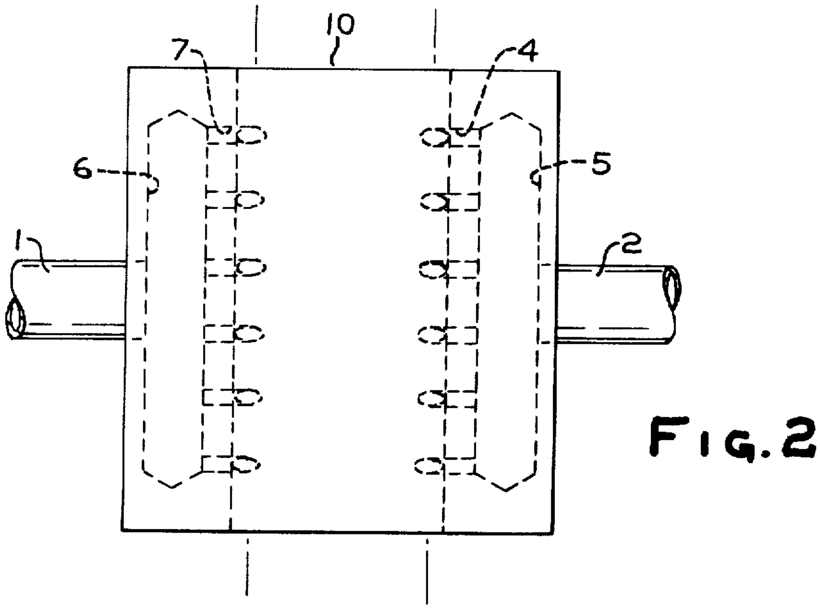
FIG. 2
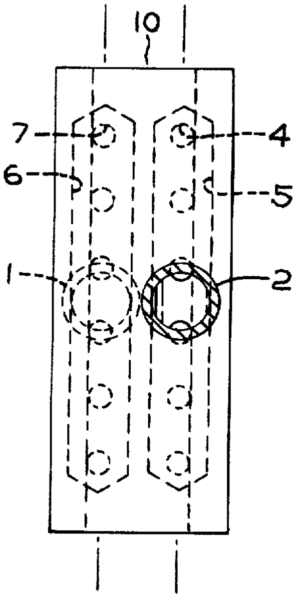
FIG. 3

METHOD OF PREPARING GLASS STRAND AND NOVEL GLASS STRAND PACKAGES

BACKGROUND OF THE INVENTION

In industry today fiber glass manufacture involves the drawing of glass fibers from a suitable molten glass source commonly called a bushing. The bushing is typically heated to maintain molten glass fed thereto from the forehearth of a glass furnace at the desired glass temperature. In some instances the bushing is used as the melter itself and in those operations, glass marbles are fed to the bushing and melted therein. Typical of two types of marble melt bushings employed are the bushings shown in U.S. Pat. No. 3,300,288 and U.S. Pat. No. 3,104,761.

The fibers or filaments drawn from the modern bushings are wound at extremely high speeds. The winding of strands containing large number of filaments now drawn from bushings, 200 to 2,000 filaments being typical in a strand, and at drawing speeds of 1,500 to 20,000 feet per minute (457.2 meters to 6,096 meters per minute) or more has caused some difficulty in handling the packages of strand so formed. These packages, called forming packages in the art, contain strand which has considerable tension applied to it as it is wound. Since glass fibers are nearly perfectly elastic, the high tension in winding introduces high compressive forces on the forming tube on which the glass fibers are collected on the winder. These forces tend to wrinkle or crease the packages when they are removed from the winder often creating flat spots on the strand. In addition, the compressive forces render it difficult to remove packages from the winder. Further, the strands as wound in conventional practices tend to have a flat appearance with the filaments appearing to be spread in lateral direction. These qualities of strand render it difficult to process strand from forming packages in a textile operation for example and thus it is typical to remove glass strands from such forming packages and subject them to a twist frame operation where the strand is twisted and wound on a bobbin for ultimate customer use.

THE PRESENT INVENTION

In accordance with the present invention a process is provided which permits the high speed winding of glass fiber strand on forming packages without incurring some of the aforementioned disadvantages of the conventional process. Thus, glass strands can be wound at high speed in a generally rounded form with excellent consolidation of the fibers. Utilizing a slow speed major traverse on the winder the process provides a micro-traverse which enables the strand to be removed from the forming package either wet or dry and coupling the winding operation with a tension reducing step eliminates the problems normally associated with the high compressive forces acting on forming packages which are typically encountered in a high speed winding of glass strands.

Thus, in accordance with this invention, glass filaments are drawn at high speed from a molten glass source, gathered into a strand and the strand is then subjected to a tension reducing step. The strand still traveling at high speed is then passed through a zone of high turbulence wherein fluid at high velocities is passed therethrough tangential to the strand. The fluid is passed around the strand as it passes through the zone in a circumferential path and whirls through said zone at high speeds. The strand, having little or no tension at this point, has a false twist imparted to it as it passes through this zone from the entry point to the exit point. As it emerges from the zone, the strand is in a curvilinear form and as it is wound on the cylindrical package positioned on the high speed winder, high frequency vibration causes the strand to be wound at a slightly more length of strand per wrap than the wrap circumference of the winder. The strand leaving the zone of turbulence due to the whirling action of the fluid and the low tension strand entrapped therein has some filament entanglement imparted thereto and assumes a more rounded configuration than the conventional flat appearance of normal glass strand wound at high speed. Micro-traversing of the strand during collection on the slowly traversing winder is also evident on close inspection of the strand as wound using the whirling fluid treatment prior to winding.

For a more detailed explanation of the invention and the novel packages produced thereby, reference is made to the accompanying drawing in which:

FIG. 1 is a cross sectional view of one embodiment of a suitable fluid turbulent device for use with the instant invention;

FIG. 2 is a longitudinal front view of the device of FIG. 1;

FIG. 3 is a longitudinal side view of the device of FIG. 1;

Figure 5:
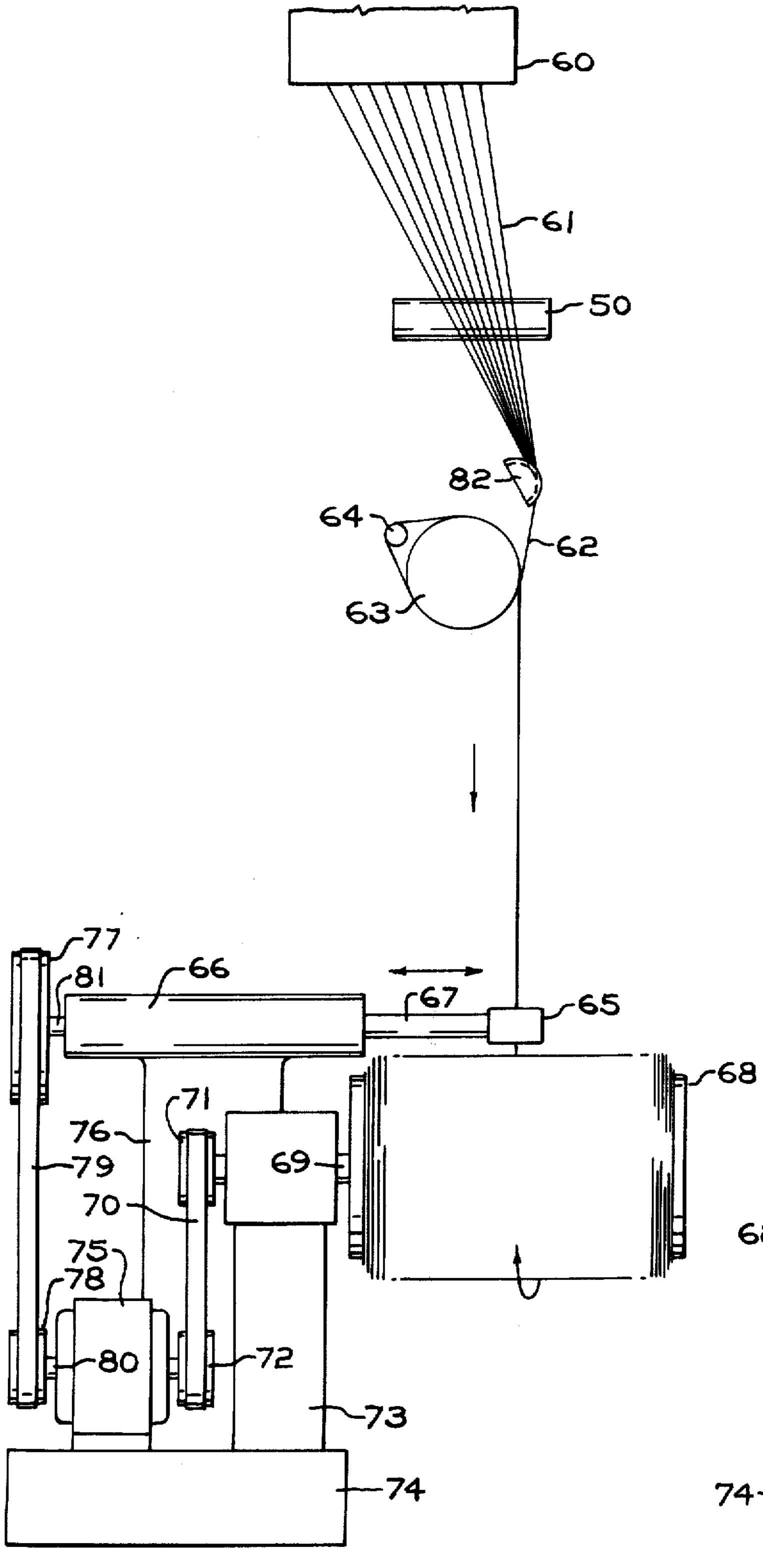
FIG. 5 is a side elevation of the strand winding system shown in FIG. 4.

Turning to the drawings, FIGS. 1, 2 and 3 show a fluid treating device which may be employed in the practice of the instant invention. As can be readily seen, the device consists of an elongated block 10 having a central cavity 8 bored therein, the cavity running from the top to the bottom of the metal block 10. Two fluid feed lines 1 and 2 are provided on either side of the block and each of the feed lines 1 and 2 communicates with a manifold chamber. Thus, feed line 1 is in fluid communication with a manifold 6 and feed line 2 with manifold member 5. The manifold 6 is closed at the top and bottom of the block 10 and distributes fluid to a plurality of feed inlets 7 which terminate in openings in the wall of the central cavity 8. Similarly, the manifold 5 is closed at the top and bottom of the block 10 and distributes fluid to a plurality of feed lines 4 which terminate in apertures in the wall of chamber 8. The apertures formed by the multiple lines or inlets 7 are arranged in vertical rows and are cut to provide a circumferential flow of fluid around the interior wall of the chamber 8 when fluid is passed into the block 10 through inlet lines 1 and 2. Block 10 is also provided with an open slot 3 which is in open communication with the chamber 8 and is provided along the length of the block 10. This slot provides for the easy insertion of the strand 11 into the chamber 8 when the strand winding operation is begun.

Figure 4:
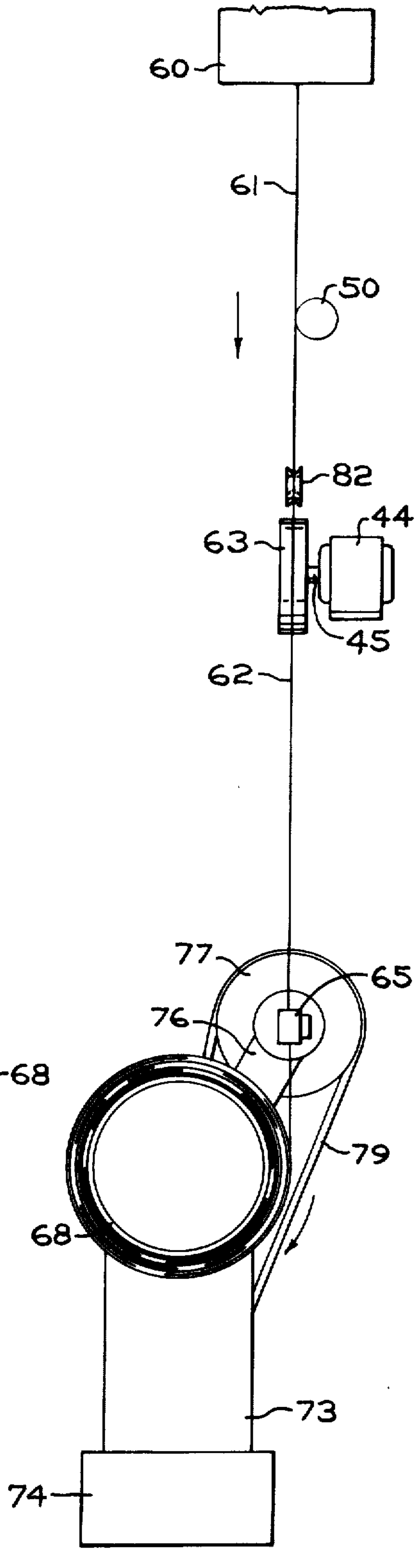
FIG. 4 is a front elevation of a fiber glass forming operation showing a single fluid turbulent device and tension reducing system in a high speed strand forming operation.

Turning to FIGS. 4 and 5, there is shown a glass strand forming operation utilizing a whirl blower of the type described in FIGS. 1, 2 and 3 in conjunction with the glass strand winding. As seen in FIG. 5, a plurality of glass filaments 61 are drawn from a glass fiber forming bushing 60. The filaments 60 are passed over an applicator roll 50 which applies a suitable size and/or coating to the filaments. The filaments 6 are then passed over a gathering shoe 82 which consolidates the filaments 61 into a unitary glass fiber strand 62. Strand 62 is passed around a motorized godet 63 provided with a smaller free-rolling wheel 64 or a guide shoe used to space the strand wrap on the godet 63 to prevent tangling on the godet surface. The godet is used to cause tension reduction to the strand. The strand 62 passes from the godet into the whirl blower or zone of fluid turbulence 65 which has the configuration of the device shown in FIGS. 1, 2 and 3.

In the embodiment shown in FIG. 5, the device 65 is reciprocated in a horizontal direction as the rod 67 moves right to left and back across the width of the winder 68.

Winder 68 is driven by a shaft 69 through pulleys 71 and 72. Pulley 72 is turned by the shaft 80 of motor 75 and the belt 70 which engages pulley 72, drives pulley 71 and the shaft 69 to rotate winder 68.

Shaft 80 also rotates a pulley 78 which is engaged by a belt 79 which engages pulley 77. Pulley 77 engages a shaft 81 and rotates it. The rotation of shaft 81 is translated by proper gears and cams, not shown, but positioned in unit 66 into forces providing for the longitudinal movement of the shaft 67.

Figure 6:
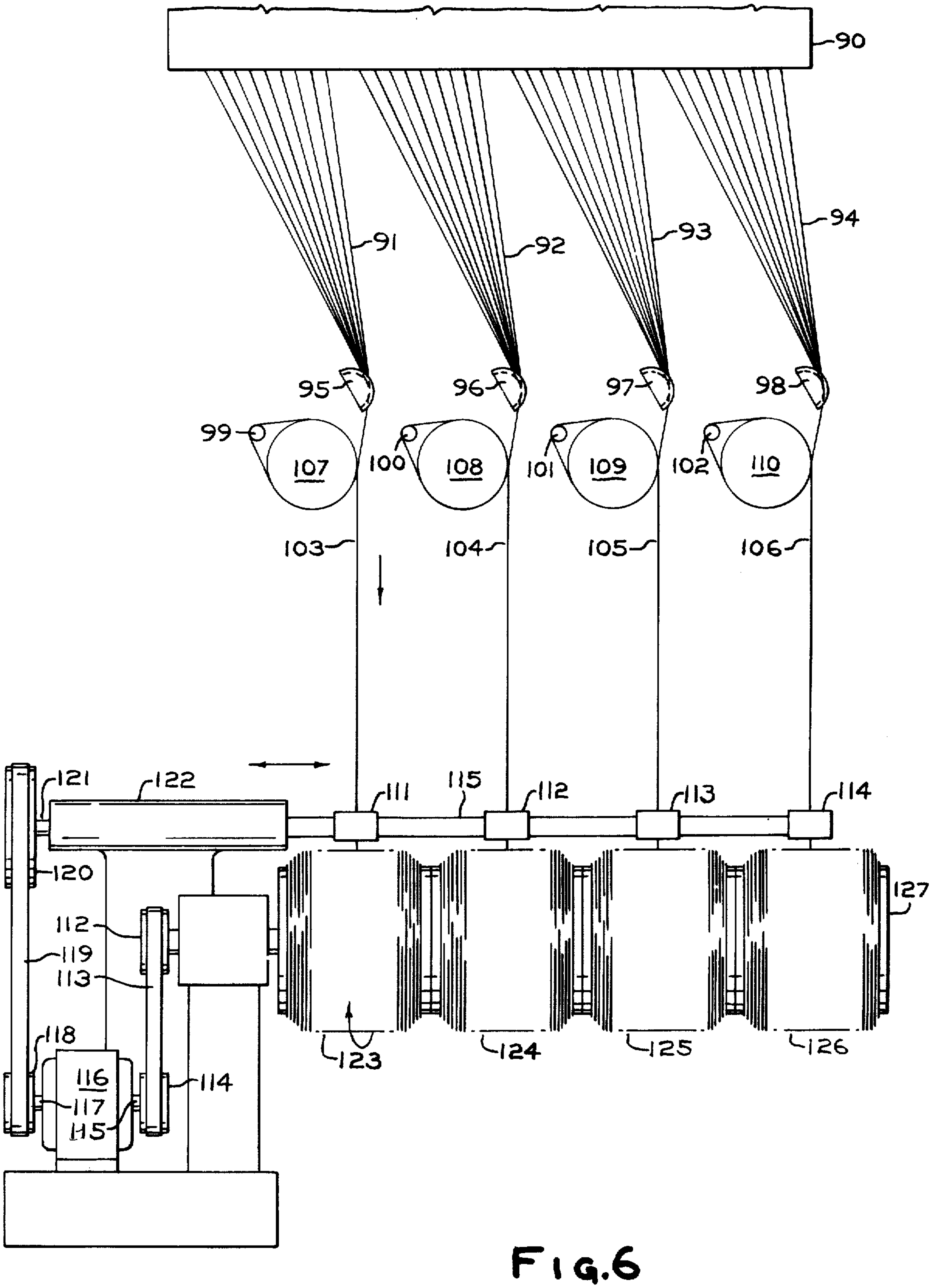
FIG. 6 is a front elevation of a strand winding operation involving the use of multiple fluid turbulent devices utilized to wind several forming packages from a single glass forming station.

In general the block 10 shown in FIGS. 1, 2 and 3 and the blowers 65, 111, 112, 113 and 114 shown in FIGS. 4, 5 and 6 which are constructed identical to the block 10, are made of metal, brass being the preferred material. The device can also be made of a fired ceramic, hard plastic or other suitable structural material. The applicator 50 shown is a conventional roller applicator which is used to place sizes or binders on the strands. Recourse to the use of pad applicators, sprays and other similar devices for applying sizes and/or binders to the fibers may be had.

The gathering shoes employed are generally grooved wheels constructed of graphite through which the filaments are drawn to consolidate the filaments into strand form. These gathering shoes may be stationary or can be rotated at slow speed if desired.

Suitable godets for use with the instant invention are those which are described by my U.S. Pat. No. 3,532,478, issued Oct. 6, 1970. In general the godet is a smooth surfaced wheel which is positively driven by a suitable motor and at speeds such that it tends to push the strands passing over its surface at a rate slightly in excess of the normal strand travel speed caused by the winder attenuation. By imparting this slight thrust to the strand during its passage over the godet, the strand tension normally associated with the attenuation from the winder is considerably reduced to provide a low tension strand for feed to the zone of fluid turbulence.

The fluids utilized in the zone of turbulence are typically gases such as air, nitrogen, oxygen, carbon dioxide and other similar gases inert to the glass strand fed thereto. Steam may also be utilized. In the preferred embodiment of the instant invention air is utilized as the gas source.

The zone of turbulence is usually of small diameter and the central cavity 8 of the zone is typically from about $\frac{1}{8}$ inch to about $\frac{3}{4}$ inch (0.3175 to 1.91 centimeters) in diameter, preferably from $\frac{1}{4}$ inch to $\frac{1}{2}$ inch (0.610 to 1.27 centimeters). Generally, the block 10 is of a length sufficient to impart a false twist to the strand during its passage through the block and its central cavity. Lengths of 1 to 6 inches (2.54 to 15.24 centimeters) are typical with 1 to 3 inches (2.54 to 7.26 centimeters) being preferable for proper traversing of strand.

Using high pressure air to the zone of turbulence as a feed through the rows of inlets arranged in vertical alignment on the wall of the cavity and with the small diameter of the cavity defining a small circumference over which the air travels, air revolves around the circumference of the cavity at values of between about 20,000 to 1,070,000 revolutions per minute for air travel are realized. Usually with cavities $\frac{1}{4}$ to $\frac{1}{2}$ inch (0.610 to 1.27 centimeters) in diameter the zone of turbulence has air flowing around it at 150,000 to 310,000 revolutions per minute.

The high speed of the air passing around the circumference of the cavity in the air turbulence zone passes around the strand causing it to rotate in a circumferential path imparting to the strand a false twist since it is at low tension. The whirling action of the air striking the strand surface as it passes circumferentially to the strand moving through the zone imparts a curvilinear wave form to the strand as it exits the zone. The strand is immediately wound on the winder with the wave form intact thus producing a low tension wound strand. This microtraversing action to the strand causes two to five strand displacements to occur per wrap on the winder 68. The fiber stress due to winding tension can therefore be relieved because of the incremental increased length of strand per wrap. It is preferred in operating winders in conjunction with the whirl blowers or zone of fluid turbulence to place the strand exit between about 2 to about 8 inches (5.08 to 20.32 centimeters) from the surface upon which it is being wound.

In the drawings the blowers 65, 111, 112, 113 and 114 are shown reciprocating across the surface of the packages to provide the lay down of strand thereon. If desired, however, the winder itself can be made to reciprocate in a horizontal plane and the blowers maintained stationary. It is also within the contemplation of this invention to reciprocate both the winder and the blower if desired.

For a more complete description of the process and using the apparatus of FIGS. 4 and 5, the process may be practiced in accordance with the following examples.

A 400 hole bushing is employed. The bushing 60 is electrically heated and maintained at about 1204.4° C. ± 100° during the strand forming operation and is fed with glass marbles. The glass filaments 61 are attenuated at speeds of about 14,000 feet per minute (4,267.2 meters per minute) gathered into strand 62 as they pass through a grooved graphite gathering shoe 82. The strand 62 leaves the surface of the rotating motorized godet after passing around it. The strand 62 passes into a blower 65 which is identical to the blowers shown in FIGS. 1, 2 and 3 and having a central cavity 8 which is 0.1875 inch (0.47625 centimeter) in diameter. The blower is about 3 inches in length and the rows of apertures 4 and 7 have seven apertures in each row opening into the cavity 8. The apertures are 0.03 inch (0.076 centimeter) in diameter. Air is fed to lines 1 and 2 at 20 to 80 pounds per square inch (1.406 to 5.624 kilograms per square centimeter) pressure. In this range of air pressure the revolutions per minute of air around the circumference of the cavity 8, which is 0.589 inch (1.496 centimeters), is in the range of 600,000 to 720,000. The strand is wrapped on the winder 68 at the attenuation speed of 14,000 feet (4,267.2 meters) per minute with the exit of strand 62 from blower 65 being about 2 inches (5.08 centimeters) from the surface of the winder on which it is wound. Provision is made to maintain the blower at this distance as strand is wound on the winder 68 by moving either the winder 68 or the blower 65 away from each other as the layers of strand build on the winder surface. This is conventional practice in the art and forms no part of the instant invention.

The strand package wound in the above fashion is found to be characterized by having, in addition to the horizontal traverse across the package width a small internal traverse caused by the curvilinear waves created in the strand as it passes through blower 65. The package can be unwound wet or dry with ease and the strands are found to be rounded in shape as opposed to the generally flat appearance of normal strand.

In the process shown in FIG. 6, multiple forming packages 123, 124, 125 and 126 are formed on the surface of a single winder 127. The blowers 111, 112, 113 and 114 are the same configuration as the blower shown in FIGS. 1, 2 and 3. In this operation the glass fiber forming bushing 90 containing molten glass produces glass filaments which are divided in four groups 91, 92, 93 and 94 by a mechanical splitting device, not shown, which is a conventional practice in the art. The filament bundles 91, 92, 93 and 94 are passed through gathering shoes 95, 96, 97 and 98, respectively, to produce strands 103, 104, 105 and 106, respectively. Strand 103 is passed around godet 107 and idler 99 to reduce tension and is then passed into blower 111. Strand 104 is passed over godet 108 and idler 106 prior to being passed through blower 112. Strand 105 is passed over godet 109 and idler roll 101 prior to being passed through blower 113. Similarly strand 106 is passed over godet 110 and idler 102 prior to being passed to blower 114. Blowers 111, 112, 113 and 114 have fluid, preferably air at high pressure 20 to 80 pounds per square inch (1.406 to 5.624 kilograms per square centimeter) passed to the central cavity of each through a plurality of longitudinal rows of apertures such as shown in the blower shown herein in FIGS. 1, 2 and 3 and thereby causes the air to revolve in the cavity of each of the blowers 111, 112, 113 and 114 at 600,000 to 720,000 revolutions per minute. Shaft 115 reciprocates in a horizontal direction through a cam and gear arrangement is box 112 which is driven by motor 116 through shaft 117, belt 119, pulley 118 and shaft 121 driven by pulley 118a connected to belt 119. The winder 127 is turned by the same motor 116 through shaft 135, pulley 134, belt 133, pulley 132 and shaft 136.

The packages 123, 124, 125 and 126 formed on the winder 127 like those formed in FIGS. 4 and 5 are characteristically possessed with a small internal traverse caused by the curvilinear waves created in strands 103, 104, 105 and 106 as they pass through blowers 111, 112, 113 and 114, respectively. These packages 123, 124, 125 and 126 can be unwound wet or dry with ease and the strands thereon are found to be rounded in shape as opposed to the generally flat appearance of strand normally wound in conventional winding operations.

While the invention has been described with reference to certain specific illustrative embodiments, it is not intended that it be limited thereby except as appears in the accompanying claims.

I claim:

1. A method of winding glass strand comprising drawing a plurality of glass filaments from a molten glass feeding means, gathering said filaments into a strand, passing the strand so formed through a tension reducing zone to reduce tension thereon, passing the strand through a fluid turbulence means wherein a gaseous fluid is introduced perpendicular to the path of strand travel and tangential to the curved wall of the means to thereby microtraverse the strand and also produce a rounded strand and winding the strand on winding surface as it emerges from said fluid turbulence means at a high speed and in traversing relation to the winding surface.

2. A method of winding fiber glass strand comprising drawing glass filaments from a molten glass feeding means, gathering said filaments into a strand, passing said strand over a godet to impart a thrust to the strand thereby reducing tension carried by the drawing force, introducing the tension reduced strand through a fluid turbulence means, passing a gaseous fluid at high speed tangential to the curved wall of the means and at high velocity to thereby microtraverse the strand and also produce a rounded strand and winding the strand on a rotating surface at high speed as it emerges from said fluid turbulence means while further traversing the strand across the winding surface by relative movement with the winding surface.

3. A method of forming glass fiber strand comprising drawing a plurality of glass filaments from a molten glass feeding means, contacting said filaments with an applicator to apply a size thereto, gathering said filaments into a strand, tension reducing said strand, passing the tension reduced strand into a fluid turbulence means, passing a gaseous fluid at a high velocity tangential to the curved wall of the fluid turbulence means to impart a false twist to said strand and create a curvilinear wave form in said strand and also microtraverse the strand and winding the strand immediately upon emergence from said fluid turbulence means on the surface of a winding collet at high speed while in proximity to said means to thereby further traverse the strand across the winding surface.

4. A method of preparing several packages of fiber glass strand simultaneously comprising drawing a plurality of filaments from each of several molten glass feeding means from a unitary attenuator winding means, gathering the plurality of filaments from each molten glass feeding means into a strand, passing each strand so formed through a separate tension reducing zone and reducing the tension thereon, passing each strand from said tension reducing zones into a separate fluid turbulence means for each strand, passing a high velocity gaseous fluid tangential to the curved wall of each of said fluid turbulence means to impart a curvilinear wave and a false twist to each of said strands and also microtraverse the strands, removing each of said strands from each of said means and winding each strand on a separate surface associated with a reciprocating rotating high speed winder in proximity to the fluid turbulence means to thereby further traverse each of the strands across the length of the surface associated therewith during winding.

5. A method of forming fiber glass strand comprising drawing glass filaments from a molten glass feeding means at high speeds, applying moisture to said filaments, gathering said filaments into strand, passing said strand over a surface that moves the strand at a speed in excess of the speed of a winding means used for attenuating and winding said strand to thereby reduce the tension in said strand, passing the strand into a high fluid turbulence means, contracting the wall of said fluid turbulence means tangentially with a gaseous fluid to thereby impart a curvilinear wave and microtraverse to the strand and also produce a rounded strand and winding said strand on a rotating winding surface in proximity to the fluid turbulence means to thereby further traverse the strand as the strand emerges from said high fluid turbulence means.

6. The method of claim 5 wherein the high fluid turbulence means is traversed across but out of center with the rotating winding surface during winding.

7. The method of claim 5 wherein the high fluid turbulence means and the strand passing therethrough define a fixed path for said strand and the winding surface is traversed to provide the collection of strand in successive layers during winding.

8. The method of claim 3 wherein the strand is further traversed by reciprocating the winding surface during winding.

9. The method of claim 3 wherein the strand is further traversed by reciprocating the zone of fluid turbulence adjacent the winding surface.

10. The method of claim 4 wherein the strands are further traversed by reciprocating the collector surface.

11. The method of claim 4 wherein the strands are further traversed by reciprocating the zones of fluid turbulence across the collector surface.

12. The method of claim 1 wherein the strand passing through the zone of fluid turbulence is contacted by a multiplicity of gaseous fluid streams positioned on the entrance of the zone which direct the gaseous fluid along the length of the strand passing through said zone, at several points along the said length simultaneously and longitudinal to the strand.

* * * * *